US007139976B2

(12) United States Patent
Kausik et al.

(10) Patent No.: US 7,139,976 B2
(45) Date of Patent: Nov. 21, 2006

(54) METHOD AND SYSTEM FOR PARAMETERIZED WEB DOCUMENTS

(75) Inventors: Balas Natarajan Kausik, Los Gatos, CA (US); Janardhanan Jawahar, San Jose, CA (US)

(73) Assignee: Fineground Networks, Cupertino, CA (US)

( * ) Notice: Subject to any disclaimer, the term of this patent is extended or adjusted under 35 U.S.C. 154(b) by 810 days.

(21) Appl. No.: 09/838,822

(22) Filed: Apr. 19, 2001

(65) Prior Publication Data

US 2002/0087547 A1 Jul. 4, 2002

Related U.S. Application Data

(63) Continuation-in-part of application No. 09/634,134, filed on Aug. 8, 2000.

(51) Int. Cl.
*G06F 15/00* (2006.01)
*G06F 17/21* (2006.01)
*G06F 17/24* (2006.01)

(52) U.S. Cl. .................... 715/522; 715/517; 715/526; 710/68

(58) Field of Classification Search ............ 715/501.1, 715/513–526, 507, 511; 709/219, 10, 200; 710/68
See application file for complete search history.

(56) References Cited

U.S. PATENT DOCUMENTS

| | | | |
|---|---|---|---|
| 5,754,766 A | 5/1998 | Shaw et al. ............... 395/200.3 |
| 5,778,372 A | 7/1998 | Cordell et al. .............. 707/100 |
| 5,862,220 A | 1/1999 | Perlman ..................... 380/21 |
| 5,880,740 A | 3/1999 | Halliday et al. ............ 345/435 |
| 5,918,225 A | 6/1999 | White et al. |
| 5,918,239 A | 6/1999 | Allen et al. ................. 715/526 |
| 5,933,811 A * | 8/1999 | Angles et al. ................ 705/14 |
| 5,946,697 A | 8/1999 | Shen |
| 6,006,227 A | 12/1999 | Freeman et al. .............. 707/7 |
| 6,011,905 A | 1/2000 | Huttenlocher et al. ...... 395/102 |
| 6,012,071 A * | 1/2000 | Krishna et al. ............. 715/522 |
| 6,018,738 A | 1/2000 | Breese et al. ............... 707/100 |
| 6,038,573 A | 3/2000 | Parks ......................... 715/513 |
| 6,076,104 A | 6/2000 | McCue |
| 6,078,917 A | 6/2000 | Paulsen, Jr. et al. ........... 707/6 |
| 6,092,090 A | 7/2000 | Payne et al. ................. 715/530 |
| 6,098,092 A | 8/2000 | Padzensky |
| 6,105,042 A | 8/2000 | Aganovic et al. ........... 715/500 |
| 6,108,703 A * | 8/2000 | Leighton et al. ............ 709/226 |
| 6,122,666 A | 9/2000 | Beurket et al. |
| 6,128,655 A * | 10/2000 | Fields et al. ................. 709/219 |
| 6,167,085 A | 12/2000 | Saunders et al. |
| 6,176,427 B1 | 1/2001 | Antognini et al. |
| 6,178,461 B1 | 1/2001 | Chan et al. ................. 709/247 |
| 6,182,125 B1 | 1/2001 | Borella et al. |
| 6,192,366 B1 | 2/2001 | Ogawa |
| 6,195,101 B1 | 2/2001 | Ghislain Bossut et al. |
| 6,199,082 B1 * | 3/2001 | Ferrel et al. ................ 715/522 |
| 6,216,121 B1 | 4/2001 | Klassen |
| 6,230,171 B1 | 5/2001 | Pacifici et al. .............. 715/512 |
| 6,243,761 B1 | 6/2001 | Mogul et al. |
| 6,247,050 B1 | 6/2001 | Tso et al. ................... 709/224 |
| 6,249,844 B1 | 6/2001 | Schloss et al. |
| 6,263,114 B1 | 7/2001 | Saunders |
| 6,272,536 B1 | 8/2001 | van Hoff et al. |
| 6,317,757 B1 | 11/2001 | Sakamaki |
| 6,317,885 B1 | 11/2001 | Fries |
| 6,405,211 B1 | 6/2002 | Sokol et al. |
| 6,466,999 B1 * | 10/2002 | Sliger et al. .................. 710/68 |
| 6,476,828 B1 | 11/2002 | Burkett et al. |
| 6,490,601 B1 * | 12/2002 | Markus et al. .............. 715/507 |
| 6,496,849 B1 * | 12/2002 | Hanson et al. .............. 709/200 |
| 6,507,856 B1 | 1/2003 | Chen et al. |
| 6,538,667 B1 | 3/2003 | Duursma et al. |
| 6,574,618 B1 | 6/2003 | Eylon et al. |
| 6,591,260 B1 | 7/2003 | Schwarzhoff et al. |
| 6,610,103 B1 * | 8/2003 | Ehrman et al. ............. 715/511 |
| 6,622,168 B1 | 9/2003 | Datta |
| 6,697,844 B1 | 2/2004 | Chan |

(Continued)

FOREIGN PATENT DOCUMENTS

EP 0434041 B1 6/1991

(Continued)

OTHER PUBLICATIONS

Aycock, John et al., An architecture for easy Web page updating, ACM Digital Library, Crossroads archive, vol. 6, Issue 2, 1999, pp. 15-18.*

(Continued)

*Primary Examiner*—William Bashore
(74) *Attorney, Agent, or Firm*—Schwegman, Lundberg, Woessner & Kluth P.A.

(57) ABSTRACT

Techniques are disclosed for constructing web (or other networked) documents as parameterized forms of other networked documents. For example, a document may be represented as a collection of changes to be applied to a first document which is incorporated by reference in the second document. Instead of delivering the entire document over a slower network connecting the content server to the content browser, the document is delivered as a collection of changes to previously delivered documents that are much closer to the user's content browser. In an exemplary embodiment of the invention, special software is not necessarily required at the end user for reconstructing the second document from the set of base documents and the set of modifications to the base documents. Instead, the second document may be encoded as a program in a scripting (or other form of computer) language that can be readily executed by common content browsers and which, upon execution, causes the second document to be displayed by the content browser.

30 Claims, No Drawings

U.S. PATENT DOCUMENTS 6,748,385 B1 * 6/2004 Rodkin et al. .............. 707/10

FOREIGN PATENT DOCUMENTS

| JP | 02001034526 A | 2/2001 |
|---|---|---|
| WO | WO 00/42519 | 7/2000 |

OTHER PUBLICATIONS

Towner, George, Auto-updating as a technical documentation tool, Proceedings of the ACM conference on Document processing systems, Jan. 2000, pp. 31-36.*

Huican Zhu and Tao Yang, "Class-Based Cache Management for Dynamic Web Content," Technical Report #TRCS00-13, Dept. of Computer Science, UCSB, published Jun. 2000; presented at IEEE InfoCOM Conference Apr. 2001; pp. 1-10.

"Whitepapers," FineGround Networks, Inc., <http://www.fineground.com/prod/whitepaper.html>, 2001, p. 1.

"Deploying FineGround Condensers in an SSL Environment: A Technical White Paper," FineGround Networks, Inc., <http://www.fineground.com/prod/whitepaper.html>, 2001, pp. 1-5.

"Breaking New Ground in Content Acceleration: A Technical White Paper," FineGround Networks, Inc., <http://www.fineground.com/prod/whitepaper.html>, 2001, pp. 1-9.

"Network Products," Inktomi Corporation, <http://www.inktomi.com/products/network/products/tscclass.html>, 1996-2001, pp. 1-2.

"Network Products," Inktomi Corporation, <http://www.inktomi.com/products/network/products/cclass_works.html>, 1996-2001, pp. 1-2.

"Network Products," Inktomi Corporation, <http://www.inktomi.com/products/network/products/cclass_tech.html>, 1996-2001, pp. 1-5.

"Network Products," Inktomi Corporation, <http://www.inktomi.com/products/network/products/cclass_edge.html>, 1996-2001, pp. 1-2.

"Network Products," Inktomi Corporation, <http://www.inktomi.com/products/network/products/tseclass.html>, 1996-2001, pp. 1-2.

"Network Products," Inktomi Corporation, <http://www.inktomi.com/products/network/products/tsengine.html>, 1996-2001, pp. 1-4.

* cited by examiner

METHOD AND SYSTEM FOR PARAMETERIZED WEB DOCUMENTS

CROSS-REFERENCE TO RELATED DOCUMENTS

This application is a continuation-in-part of co-pending application Ser. No. 09/634,134, filed on Aug. 8, 2000, which is hereby incorporated by reference in its entirety. This application is related to co-pending application Ser. No. 09/816,802, filed on Mar. 23, 2001.

FIELD OF THE INVENTION

The present invention relates to accelerating the delivery of content and reducing congestion in a networked environment. In particular, a second document can be described as a modification of one or more first documents in such a manner that the second document can be downloaded and correctly displayed by commonly deployed content browsers without necessarily requiring additional software.

BACKGROUND

It is commonly required to personalize a web document for each user who views the document. Such personalization might involve an advertisement that is targeted on the basis of the preferences of the user, or information such as quotes for stocks in the user's portfolio etc. Furthermore, it is also commonly required to update pages that a user or a group of users has previously viewed with fresh information on stock prices, news etc. In either case, the web document requested by the user comprises content that is common to another web document previously delivered to the same user or other users, as well as content that is new and possibly particularized to the user. Furthermore, the common content typically forms the majority of the bytes in the document. In other words, only a small percentage of the document changes between subsequent downloads.

In the background art (see, e.g., U.S. Pat. No. 6,178,461), it is known to encode web documents as variations of previously delivered documents that require explicit action on the part of the user's content browser. In particular, the user's content browser selects one or more objects from its cache that it expects to be similar to the current document and includes references to these documents when requesting the current document from the content server. The difficulty with this browser-driven approach is that it requires millions of content browsers to be upgraded to include this modification. Furthermore, it requires that the server have access to the millions of old documents previously transmitted to the users in order to correctly recover the base documents referenced in each request.

Another approach was disclosed in co-pending U.S. patent application Ser. No. 09/634,134, filed on Aug. 8, 2000, which is hereby incorporated by reference in its entirety. That application disclosed general techniques for transmitting the incremental differences between successive downloads of web documents were disclosed. In the present application, we expand upon those teachings.

SUMMARY

The present invention includes methods and systems for constructing web (or other networked) documents as parameterized forms of other web (or other networked) documents. For example, a document may be represented as a collection of changes and insertions to be applied to one or more first documents, where the first document(s) is incorporated by reference in the second document. Such first documents are typically previously delivered documents that may be in the local cache of the user's content browser, or a network cache common to several users. Thus, instead of delivering the entire document over the slower wide-area network connecting the content server to the content browser, the document is delivered as a collection of changes to previously delivered documents that are much closer to the user's content browser. For example, the collection of changes may travel across a wide-area network, while the first documents are accessed from the local cache of the browser or from a network cache across a local-area network. The foregoing has the advantages of reducing both bandwidth usage as well as the time required to deliver a document, and is particularly well suited for (but not limited to) dynamically generated and personalized content. Examples of dynamically generated, personalized, and continually changing content are stock quotes, account information, personalized news feeds, etc.

In an exemplary embodiment of the invention, special software is not necessarily required at the end user for reconstructing the second document from the set of base documents and the set of modifications to the base documents. This is of commercial significance where distributing special software to millions of users may be an obstacle. In various aspects of this exemplary embodiment, the server may decide which documents to use as base documents, and may also maintain copies of those documents it intends to use as base documents, in a manageable and controlled fashion. Lastly, since these base documents will be frequently referenced in many requests, they may also be stored in network caches.

DETAILED DESCRIPTION

For convenience, the invention will be described herein with respect to "documents" (or, equivalently, "files") which should be understood to include any content-bearing items transmitted in a networked environment, including, without limitation, text, data or graphic files (or combinations thereof), images, objects, programs, scripts, audio, video, and other kinds of documents. More specifically, one preferred embodiment of the invention is described with respect to documents comprised of byte strings. Those skilled in the art will understand that the teachings of the invention readily extend to other forms of documents deliverable on a network. Thus, the term "strings" should be understood to be equally applicable to other types of content elements as appropriate to the nature of the document.

The system contemplates a computer and software running thereon. The system takes as input a "current" document, which is to be transmitted to the user. The system then selects one or more first documents, which are the "base" documents to be incorporated by reference in the transmission. Of course, a "current document" is not necessarily the latest available version as of the time of transmission, only that it supersedes a base version of the document. Similarly, a "base document" is not necessarily the earliest available document, or even one that has actually been sent to a particular user (e.g., a base document could be a template stored on the content server), only that it forms the basis for the "current document" to be transmitted to the user.

The base document is typically selected on the basis of its similarity to the current document, and is typically selected to be an older and previous version of the same document or related document. For example, if the current document is a brokerage report on a particular stock, the base document could be an older report on the same stock, or an older report on a different stock. As another example involving online retail, if the current document describes an item of clothing, the base document could be describing another related item. By comparing the base documents with the current document, the current document is decomposed into strings that occur in one of the base documents and strings that do not occur in any of the base documents. Techniques for efficient comparison of the base and current documents to identify the various substrings are disclosed in co-pending U.S. patent application Ser. No. 09/634,134. The current document is then represented as a series of substrings of the base documents, interspersed with clear-text strings that do not occur in any of the base documents. The representation is encoded as a program in a scripting language such as Javascript that can be readily executed by common content browsers, and upon execution, causes the current document to be reconstructed and displayed by the content browser.

The base document is typically selected with respect to the context of the user's request for the current document. One possibility is to set the base document to be an older version of the current document, and to periodically update the base document when the size of the changes between the current document and the base document exceeds a certain limit. Another possibility is to dynamically select the base document as a central and representative document from amongst a collection of documents. In yet another possibility, the base document could be a template document explicitly constructed for the purpose, and never delivered in a visible form to the content browser. More detail about these possibilities are disclosed in co-pending U.S. patent application Ser. No. 09/816,802, filed on Mar. 23, 2001, which is hereby incorporated by reference in its entirety.

EXAMPLE OF OPERATION INVOLVING TEXT DOCUMENTS

As an example of operation, consider the situation where the documents are text documents. Further suppose that the base document consists of the text "pack my box with five dozen liquor jugs", and the second document consists of the text "pack my box with five dozen liquor mugs." It is clear that characters 1 through 35 and characters 37 through 40 of the second document are same as those of the base document. The two documents differ only at character position 36, where the character "m" occurs in the second document as compared to the character "j" in the base document. The proposed system constructs the following programmatic representation of the second document that is exemplary of programs in scripting languages such as Javascript, which are "interpretable" by the content browser in that programs written in such languages can be executed on-the-fly by the content browser. Those skilled in the art will realize that this can also be implemented in languages that are executed via being compiled rather than via being interpreted.

var base_string=base_document;

print(base_string,1,35);

print("m");

print(base_string,37,40);

When downloaded and executed by a content browser, the above program will display characters 1 through 35 of the base document, the clear text character "m" and then characters 37 through 40 of the base document.

OTHER EMBODIMENTS AND ASPECTS OF THE INVENTION

If the base document has been previously downloaded by the content browser and is resident on the browser's cache, the browser may use the cached copy, saving the time and bandwidth required to download the base document. If the base document is not in the browser cache, the browser may request the base document from the network. For example, in an exemplary embodiment of the invention, as the browser's request for the base document travels towards the content server, it may encounter one or more network caches or "proxies" at points of aggregation such as the enterprise network point or the Internet Service Provider's network head. A network cache or other point of aggregation containing the base document can respond to the browser's request therefor. Thus, the content server can present documents as dynamic updates to previously transmitted and cached versions of other documents, without explicit regard to where such base documents may be cached.

In order to enable that base documents be available for repeated use over long periods of time, it is beneficial to configure them to bear names or URLs that are unlikely to be repeated or conflict with the URLs of other documents. For example, the base documents might be assigned URLs that are randomly selected integer IDs. By making these IDs sufficiently long, the likelihood that such a URL will clash with another can be made impractically small. Still other ways for minimizing conflicts between names will be apparent to those of skill in the art, and need not be described in detail here.

Another consideration is the life of a base document in a network or browser cache. Such caches typically require that the valid life of a document be declared explicitly at the time of transmission. For example, a network cache will continue to use a base document over the specified life of the document. Once that life has expired, the network cache will discard that document. In order to reuse base documents over the longest life, it is beneficial that base documents carry a lifetime that is greater than their expected usage time. Their expected life can typically be estimated by the average time over which the difference between the current document and the base document exceeds some preset limit (at which point the base document is typically replaced).

The various embodiments described above should be considered as merely illustrative of various embodiments of the present invention. Those skilled in the art will realize that the present invention in its most general form is applicable regardless of whether the user is a person at a networked computer or a wireless device, or a network device such as a cache or proxy agent. Those skilled in the art will also realize that various aspects of the present invention are applicable to the full range of data forms transmitted on the Internet or other types of networks, including but not limited to text, images, video and audio.

For example, consider a situation wherein an image encoded in JPEG is to be delivered to the user's content browser, with a small modification that is particular to the user. In this situation, the base image is the original image, and the current image is the modified image to be delivered. Since JPEG encoded images are treated typically as 8×8 blocks of pixels, the modified image can be described as a parameterization of the base image, wherein the modified blocks are to replace the original blocks. That is, blocks in JPEG images are equivalent to "strings" of a document.

Likewise, if the image were to be encoded in GIF format which uses run length encoding, the image is described as a series of runs of the same color. A modification of such an image can be described as a parameterization, wherein certain runs of the base image are to be replaced by certain other runs of the modified image. That is, runs in a GIF image are equivalent to "strings" of a document.

As another example, consider a situation wherein a sequence of digitized video is to be delivered to the user's content browser (e.g., a video player or decoder), but that the sequence of video is to be interspersed with some advertising that is targeted to each specific user. In this situation, the "base sequence" (or base document) is the original piece of video, and the "current sequence" (or current document) is the piece of video with the advertisements inserted. Those skilled in the art will immediately realize that the current sequence can be described as a parameterization of the base sequence, wherein the advertisements are specified to be inserted at specific timing points in the base sequence. More specifically, consider a video sequence embedded in the MPEG format. Typically, the MPEG format bundles approximately 15 frames of video into a block, and treats each block independently of the other blocks. At normal playback, 15 frames represent one half of one second in elapsed time. Since each block of frames is independent of other blocks, video sequences representing advertisements and other customized material can be interspersed between two blocks as a third independent block. That is, blocks of frames in MPEG images are equivalent to "strings" of a document. The example below shows one embodiment of the invention for video sequences, on a hypothetical MPEG player. Specifically, the example depicts the insertion of an advertisement sequence between frames 450 and 451 of the original sequence.

var base_MPEG_sequence=movie;
    play (base_MPEG_sequence,1,450);
    play (advertisement_sequence_1);
    play (base_MPEG_sequence,451,1500);

Those skilled in the art will realize that digitized audio sequences in MP3 and similar formats also use block-based encoding as in MPEG, can be treated in a fashion similar to digital video.

Thus the various embodiments and aspects described above are not intended to be exhaustive or to limit the invention to the forms disclosed. Those skilled in the art will readily appreciate that still other variations and modifications may be practiced without departing from the general spirit of the invention set forth herein. Therefore, it is intended that the invention be defined by the claims that follow.

What is claimed is:

1. A method for constructing parameterized web documents comprising:
   receiving as input a current document to be distributed to a user;
   identifying a base document that serves as a reference for said current document;
   executing a first computer program to decompose said current into strings that occur in said base document, and strings that do not occur in said base document;
   creating a second computer program that when executed on a content browser recreates and displays the current document from said base document, and said strings that do not occur in said base document; and
   distributing said second computer program to said user in place of sending to said user said current document in its entirety.

2. The method of claim 1 wherein said second computer program includes: a base document identifier; references to portions of said base document for strings that occur in said base document; and references to strings that do not occur in said base document.

3. The method of claim 1 wherein said second computer program is in a scripting language executable on a content browser of said user.

4. The method of claim 3 where said scripting language is Javascript.

5. The method of claim 1 wherein said second computer program is configured so that no special software is required at the user for reconstructing said current document.

6. The method of claim 1 wherein said second computer program is configured to be self-executing on said content browser.

7. The method of claim 1 wherein said base document shares content with said current document.

8. The method of claim 1 wherein said base document is accessible to said user from a cache.

9. The method of claim 8 wherein said cache is a local cache of said user's content browser.

10. The method of claim 8 wherein said cache is a network cache common to a plurality of users.

11. The method of claim 8 wherein said base document is encoded with a lifetime that is greater than an expected usage time therefor.

12. The method of claim 8 further comprising replacing said base document in said cache when a difference between said current document and said base document exceeds a threshold value.

13. The method of claim 1 wherein said second computer program includes a reference to said base document.

14. The method of claim 13 wherein said reference to said base document is configured to substantially minimize conflicts with references to non-base documents.

15. The method of claim 13 wherein said reference to said base document is a storage location identifier.

16. The method of claim 15 where said storage location identifier is a URL.

17. The method of claim 16 where said URL contains a substantially random number.

18. The method of claim 1 wherein identifying said base document is based on degree of similarity to said current document.

19. The method of claim 18 wherein said base document is a previous version of the current document.

20. The method of claim 1 wherein said base document is a template for said current document.

21. The method of claim 1 wherein said documents are block-based and said strings are said blocks.

22. The method of claim 21 wherein said block-based documents are representations of video sequences.

23. The method of claim 21 wherein said block-based documents are representations of audio sequences.

24. A computer-readable storage medium encoded with program logic instructions for improving network efficiency of document transmission from a content server to a user, said processing instructions when executed on a computer:
   receiving as input a current document to be distributed to a user;
   identifying a base document that serves as a reference for said current document;
   decomposing said current document into strings that occur in said base document, and strings that do not occur in said base document;
   creating a computer program that when executed on a content browser recreates and displays the current document from said base document, and said strings that do not occur in said base document; and distributing said computer program to said user in place of sending to said user said current document in its entirety.

25. A file server located between, and configured to improve network efficiency of document transmission between, a content server and a user, comprising:
an input interface configured to:
receive a current document to be distributed to a user, and
identify a base document that serves as a reference for said current document;
a condensation module configured to:
decompose said current document into strings that occur in said base document, and strings that do not occur in said base document, and
create a computer program that when executed on a content browser recreates and displays the current document from said base document, and said strings that do not occur in said base document; and
an output interface configured to distribute said computer program to said user in place of sending said current document in its entirety.

26. The file server of claim 25 further comprising a cache configured to provide said base document.

27. A method for constructing parameterized web documents comprising:
receiving as input content strings to be distributed to a user;
obtaining a base document that serves as a reference for said content strings;
executing a first computer program to represent a current document to be transmitted to said user as a combination of said input content strings and at least one portion of said base document;
creating a second computer program in a scripting language that when executed on a content browser recreates and displays the current document from said base document, and said input content strings; and
distributing said second computer program to said user in place of sending said current document in its entirety.

28. A computer-readable storage medium encoded with program logic instructions for improving network efficiency of document transmission from a content sewer to a user, said processing instructions when executed on a computer:
receiving as input content strings to be distributed to a user;
obtaining a base document that serves as a reference for said content strings;
representing a current document to be transmitted to said user as a combination of said input content strings and at least one portion of said base document;
creating a computer program in a scripting language that when executed on a content browser recreates and displays the current document from said base document, and said input content strings; and
distributing said computer program to said user in place of sending said current document in its entirety.

29. A file server located between, and configured to improve network efficiency of document transmission between, a content server and a user, comprising:
an input interface configured to:
receive content strings to be distributed to a user, and
obtain a base document that serves as a reference for said content strings;
a condensation module configured to:
represent a current document to be transmitted to said user as a combination of said input content strings and at least one portion of said base document, and
create a computer program that when executed on a content browser recreates and displays the current document from said base document, and said input content strings; and
an output interface configured to distribute said computer program to said user in place of sending said current document in its entirety.

30. The file server of claim 29 further comprising a cache configured to provide said base document.

* * * * *

UNITED STATES PATENT AND TRADEMARK OFFICE
CERTIFICATE OF CORRECTION

PATENT NO. : 7,139,976 B2 Page 1 of 1
APPLICATION NO. : 09/838822
DATED : November 21, 2006
INVENTOR(S) : Kausik et al.

It is certified that error appears in the above-identified patent and that said Letters Patent is hereby corrected as shown below:

On the Title page, in field (56), under "U.S. Patent Documents", in column 2, line 19, delete "B1" and insert -- B2 --, therefor.

In column 8, line 3, in Claim 28, delete "sewer" and insert -- server --, therefor.

Signed and Sealed this

Sixth Day of February, 2007

JON W. DUDAS
*Director of the United States Patent and Trademark Office*